United States Patent [19]

Shibata et al.

[11] Patent Number: 4,987,178

[45] Date of Patent: Jan. 22, 1991

[54] CATIONICALLY ELECTRODEPOSITABLE FINELY DIVIDED GELLED POLYMER AND CATIONICALLY ELECTRODEPOSITABLE COATING COMPOSITION CONTAINING SAME

[75] Inventors: Terukazu Shibata, Hiratsuka; Akira tominaga, Chigasaki; Tadayoshi Hiraki, Odawara, all of Japan

[73] Assignee: Kansai Paint Co., Hyogo, Japan

[21] Appl. No.: 166,311

[22] Filed: Mar. 10, 1988

[30] Foreign Application Priority Data

Mar. 11, 1987 [JP] Japan .................................. 62-54141
Jun. 17, 1987 [JP] Japan .................................. 62-149257

[51] Int. Cl.$^5$ ............................................. C08L 41/00
[52] U.S. Cl. ..................................... 524/547; 526/279
[58] Field of Search ......................... 524/547; 526/279

[56] References Cited

U.S. PATENT DOCUMENTS 4,147,688  4/1979  Makhlouf et al. ................... 526/279
4,578,417  3/1986  Furukawa et al. .................. 524/547

FOREIGN PATENT DOCUMENTS 0050249  4/1982  European Pat. Off. .

OTHER PUBLICATIONS

Database Wpil, No. 86-003701, Derwent Publication; & JP-A-229 967 (Nippon Paint K.K.), 15-11-1985 * Abstract *.
Chemical Abstracts, vol. 82, 1974, p. 112, Abstract No. 107522w, Columbus, Ohio, U.S.; & JP-A-73 36 922 (Asahi Chemical Ind. Co. Ltd.), 08-11-1973 * Abstract *.

Primary Examiner—Joseph L. Schofer
Assistant Examiner—J. M. Reddick
Attorney, Agent, or Firm—Wenderoth, Lind & Ponack

[57] ABSTRACT

A cationically electrodepositable finely divided gelled polymer obtained by dispersing an acrylic copolymer containing a hydrolyzable alkoxysilane group and a cationic group in water and crosslinking the dispersed copolymer particles thereinside. A cationically electrodepositable coating composition containing the aforesaid polymer can form a thick coated film having excellent smoothness on an edge portion of a corner or a projected portion to improve the anticorrosion of the edge portion.

13 Claims, No Drawings

CATIONICALLY ELECTRODEPOSITABLE FINELY DIVIDED GELLED POLYMER AND CATIONICALLY ELECTRODEPOSITABLE COATING COMPOSITION CONTAINING SAME

This invention relates to a cationically electrodepositable finely divided gelled polymer, and more specifically to a cationically electrodepositable finely divided gelled polymer wherein an acrylic copolymer having a hydrolyzable alkoxysilane group and a cationic group is dispersed in water and crosslinking of the dispersed copolymer particles is conducted thereinside, and a process for producing same.

More specifically, this invention relates to a cationically electrodepositable coating composition containing the above finely divided gelled polymer which can form a thick coated film having excellent smoothness on an edge portion of a corner or a projected portion.

Finely divided polymers which are gelled by a crosslinking reaction of particles thereinside and methods for producing same have been so far widely known. Examples thereof are a method wherein a monomer mixture containing a crosslinking monomer with at least two ethylenic double bonds is emulsion polymerized in an aqueous system (British Pat. No. 967,051), and a method wherein a monomer mixture containing glycidyl (meth)-acrylate and (meth)acrylic acid is dispersion polymerized in a nonaqueous system using a dispersion stabilizer and at the same time the functional groups are reacted (U. S. Pat. No. 4,147,688). In particular, as a method using an alkoxysilane monomer in an aqueous system, there have been proposed a method wherein a mixture of an alkoxysilane monomer and another monomer are emulsion polymerized in an aqueous medium using a surface active agent (European Pat. No. 153,600), a method wherein an alkoxysilane monomer, (meth)acrylic acid and another monomer are copolymerized and then dispersed in water to afford a delustering electrodeposition-coated film for aluminum building materials (Japanese Laid-open Pat. application No. 67,396/1984), and a method for producing an aqueous solution of a composition comprising an acrylic polymer containing an alkoxysilane group and a carboxyl group and a colloidal silica (Japanese Pat. Publication No. 47,178/1986).

The finely divided gelled polymers obtained by the conventional methods are added to coating compositions to influence rheological characteristics or physical properties and consequently contribute to improvements in spray efficiency of coatings, antisagging of coated films and pattern controlling of metallic pigments.

On the other hand, cationically electrodepositable coatings which have been widely used mainly in automobile industry are excellent in anticorrosion, throwing power and uniformity of film thickness and find wide use in undercoating of an automobile body. However, there are drawbacks that a coated film on an edge portion of a product being coated does not become thick and an edge covering property is poor. Moreover, the coated film resulting from electrodeposition coating generally lacks smoothness because a gas occurs in electrodeposition and a solids content is high (small amount of a solvent).

As a method to improve smoothness, it has been suggested that said coated film is allowed to melt-flow in baking to cure the electrodeposition-coated film. Especially, a cationically electrodepositable coating is in general markedly low in melt viscosity of a coated film. Consequently, smoothness is improved by the above method, but the coated film is liable to melt-flow, with a result that a cured coated film is little or not formed on an edge portion and anticorrosion goes notably poor in that portion.

For improving anticorrosion of the edge portion, for example, anticorrosive steel plates have been hitherto used, or anticorrosive paints have been coated on the edge portion by means of a roller, a brush, etc., which involves enormous cost and a large number of steps though. For improving anticorrosion of the edge portion, attempts have been made to blend electrodepositable coatings with large amounts of pigments, to minimize amounts of plasticizer components, and so forth. Nevertheless, smoothness and formability of the coated film on the edge portion (hereinafter called a "edge covering property") are inconsistent, and it has been increasingly demanded to develop cationically electrodepositable coatings that satisfy both these properties.

In order to solve said problems, the present inventors have focussed on application of the aforesaid finely divided gelled polymer to the cationically electrodepositable coating, and made studies. However, the conventional finely divided gelled polymer is mostly a nonaqueous dispersion or an anionic or nonionic dispersion obtained by emulsion polymerization with a surface active agent, and is ordinarily hard to use in a cationically electrodepositable coating. Even though the conventional finely divided gelled polymer can be applied to a cationically electrodepositable coating, stability of an electrodeposition bath, electrodeposition characteristics and water resistance and anticorrosion of a coated film are impaired, and it cannot withstand practical use in this field.

In the circumstances, the present inventors have made extensive studies to develop a cationically electrodepositable finely divided gelled polymer useful as a rheology controlling agent of a cationically electrodepositable coating. As a result, it has been found that an acrylic copolymer having alkoxysilane groups and cationic groups is dispersed in water, and then silanol groups formed by hydrolysis of the alkoxy-silane groups are condensed with each other and are optionally further condensed with hydroxyl groups present in the acrylic copolymer to conduct crosslinking of the dispersed copolymer particles thereinside, thereby enabling formation of gelled fine particles having extremely good dispersion stability and cationic electrodepositability.

When an ordinary cationically electrodepositable coating resin composition is blended with said particles, there results a cationically electrodepositable coating composition whose decrease in melt viscosity of a coated film in baking and curing the electrodeposition-coated film is controlled and being excellent in both smoothness of a coated surface and edge covering property. The findings have led to completion of this invention.

Thus, according to one aspect of this invention, there is provided a cationically electrodepositable finely divided gelled polymer characterized in that an acrylic copolymer containing a hydrolyzable alkoxysilane group and a cationic group is dispersed in water and crosslinking is conducted inside particles.

According to another aspect of this invention, there is provided a process for producing a cationically electrodepositable finely divided gelled polymer which comprises neutralizing an acrylic copolymer containino a hydrolyzable alkoxysilane group and a cationic group with an acid, dispersing the copolymer in water, and then heating the dispersion at 50° C. or higher, or dispersing the acrylic copolymer in water in the presence of a catalyst for condensation of the silanol group.

According to still another aspect of this invention, there is provided a cationically electrodepositable coating composition characterized in that a finely divided gelled polymer obtained by dispersing an acrylic copolymer containing a hydrolyzable alkoxysilane group and a cationic group in water and conducting crosslinking inside particles is contained in an amount of 1 to 35% by weight based on the total resin solids content.

The "acrylic copolymer containing a hydrolyzable alkoxysilane group and a cationic group" here referred to is a copolymer such that cationic groups, especially amino groups neutralized with an acid are dispersed stably in water as water dispersing groups and silanol groups formed by hydrolysis of the alkoxysilane groups are condensed with each other and optionally with hydroxyl groups present in the acrylic copolymer to allow crosslinking of the particles thereinside, thereby forming a cationically electrodepositable finely divided gelled polymer. In this invention, the thus formed finely divided gelled polymer can preferably be contained in a cationically electrodepositable coating composition.

The above "cationically electrodepositable finely divided gelled polymer" includes a cationically electrodepositable finely divided polymer having an average particle size of 0.5 micron or less and obtained by stably dispersing in water a cationic group, above all, an amino group neutralized with an acid as a water dispersing group and causing gelation by crosslinking inside particles.

The acrylic copolymer containing the hydrolyzable alkoxysilane group and the cationic group, used to form the above finely divided gelled polymer can generally be produced by copolymerizing a monomer mixture composed of, as essential momomer components, (a) a polymerizable unsaturated vinylsilane monomer containing a polymerizable unsaturated double bond and hydrolyzable alkoxysilane groups and (b) a polymerizable unsaturated monomer containing a polymerizable unsaturated double bond and a cationic group, and optionally as additional monomer components, (c) a polymerizable unsaturated monomer containing a polymerizable unsaturated double bond and a hydroxyl group and/or (d) the other polymerizable unsaturated monomer than the above.

The above vinylsilane monomer (a) includes monomers represented by formulas (i) and (ii)

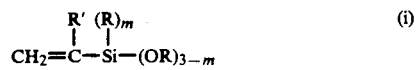

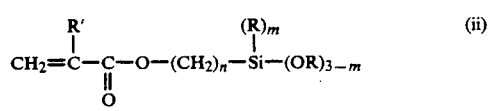

wherein R denotes an alkyl or alkoxyalkyl group having 1 to 10 carbon atoms, R' denotes a hydrogen atom or a methyl group, m is 0 or an integer of 1 and n is an integer of 1 to 8.

Examples of the vinylsilane monomer represented by formula (i) include vinyltrimethoxysilane, vinyltriethoxysilane and vinyltris-beta-methoxyethoxysilane. Examples of the vinylsilane monomer represented by formula (ii) include gamma-acryloxypropyltrimethoxysilane, gamma-methacryloxypropyltrimethoxysilane and gamma-methacryloxypropylmethyldimethoxysilane. Of these, gamma-methacryloxypropyltrimethoxysilane is preferable.

The polymerizable unsaturated monomer (b) containing the polymerizable unsaturated double bond and the cationic group is a monomer component to introduce a cationic group for imparting water-dispersibility to the resulting acrylic copolymer. Examples of the cationic group are a tertiary amino group, a quaternary ammonium salt group, a tertiary sulfonium salt group and a quaternary phosphonium salt group. Of these, the tertiary amino group is most preferable.

Examples of the polymerizable unsaturated monomer containing the polymerizable unsaturated double bond and the tertiary amino group include dialkylaminoalkyl (meth)acrylates in which each of the alkyls has preferably 1 to 6 carbon atoms, such as dimethylaminopropyl (meth)acrylate and diethylaminoethyl (meth)-acrylate; and dialkylaminoalkyl(meth)acrylamides in which each of the alkyls has preferably 1 to 6 carbon atoms, such as dimethylaminopropyl(meth)acrylamide and diethylaminoethyl(meth)acrylamide.

Examples of the polymerizable unsaturated monomer containing the polymerizable unsaturated double bond and the quaternary ammonium salt group include 3-acrylamido-3-methylbutyltrimethylammonium chloride, 3-methacrylamido-propyltrimethylammonium chloride and 2-methacryloyloxyethyltrimethylammonium chloride.

The polymerizable unsaturated monomer (c) containing the polymerizable unsaturated double bond and the hydroxyl group is a monomer component to optionally introduce a hydroxyl group into the acrylic copolymer, and the hydroxyl group acts as a hydrophilic group in dispersing the acrylic copolymer in water and/or a functional group for crosslinking reaction inside dispersed particles. Examples of the unsaturated monomer include (meth)acrylic acid hydroxyalkyl esters such as 2-hydroxyethyl (meth)acrylate and hydroxypropyl (meth)acrylate.

The other polymerizable unsaturated monomer (d) is a remaining component constituting the acrylic copolymer. Examples thereof are known monomers employed to form ordinary acrylic resins, for example, (meth)acrylic acid alkyl ($C_1$–$C_{18}$) esters such as methyl (meth)acrylate, ethyl (meth)acrylate, propyl (meth)acrylate, isopropyl (meth)acrylate, butyl (meth)acrylate, hexyl (meth)-acrylate, octyl (meth)acrylate and lauryl (meth-)acrylate; alicyclic (meth)acrylate such as cyclohexyl acrylate; vinyl aromatic monomers such as styrene, alpha-methylstyrene and vinyltoluene; amide derivatives of (meth)-acrylic acid free from a tertiary amino group; and (meth)-acrylonitrile. These monomers (d) are properly selected depending on properties required of the resulting acrylic polymer. They may be used either singly or in combination.

The aforesaid monomers (a) to (d) constituting the acrylic copolymer in this invention are used preferably within the following ranges.

(a) monomer: 1 to 30% by weight, preferably 3 to 20% by weight, more preferably 5 to 15% by weight
(b) monomer: 5 to 30% by weight, preferably 5 to 25% by weight, more preferably 5 to 20% by weight
(c) monomer: 0 to 30% by weight, preferably 5 to 20% by weight, more preferably 5 to 15% by weight
(d) monomer: 10 to 94% by weight, preferably 35 to 82% by weight, more preferably 35 to 50% by weight There is another method for producing an acrylic copolymer containing a hydrolyzable alkoxysilane group and a cationic group wherein in copolymerizing the unsaturated monomers (a) to (d), a glycidyl group-containing unsaturated vinyl monomer (e.g. glycidyl acrylate and glycidyl methacrylate) is used instead of the monomer (b) to form a glycidyl group-containing acrylic copolymer, and said glycidyl group is then reacted with a secondary amine or tertiary amine salt to introduce a tertiary amino group or a quaternary ammonium salt group or said glycidyl group is reacted with a secondary sulfide salt or a tertiary phosphine salt to introduce a tertiary sulfonium salt group or a quaternary phosphonium salt group. It is usually preferable to introduce the tertiary amino group.

The unsaturated monomers (a) to (d) can be copolymerized by a known method for producing an acrylic copolymer, above all, a solution polymerization method. For instance, the copolymerization can be usually performed by continuing the reaction of the above monomer mixture in a suitable solvent in the presence of a catalyst for radical polymerization at a reaction temperature of about 0 to about 180° C for about 1 to about 20 hours.

It is desirous to use a water-miscible solvent that dissolves the resulting polymer so as not to allow gelation during copolymerization.

Examples of such solvent are alcohol solvents, ether alcohol solvents, ether solvents, ketone solvents and ester solvents.

Examples of the catalyst for polymerization include azo compounds, peroxide compounds, sulfides, sulfins, diazo compounds and nitroso compounds.

In order to prevent the resulting polymer from being unnecessarily granulated by a crosslinking reaction of an alkoxysilane during the copolymerization, the copolymerization reaction may be carried out on adding a dehydrating agent such as dimethoxypropane for removing water as a catalyst for crosslinking reaction.

It is generally desirable that the thus obtained acrylic copolymer has an amine value of about 10 to about 100, preferably about 15 to about 80, more preferably 20 to 75; a hydroxyl value of 0 to about 200, preferably about 30 to 130, more preferably 40 to 100; and a number-average molecular weight of about 5,000 to about 100,000, preferably about 7,000 to about 30,000, more preferably 10,000 to 25,000.

When the amine value of the acrylic cocopolymer is less than 10, dispersibility in water is generally poor and coarse particles tend to occur. Meanwhile, when the amine value is more than 100, gelation tends to take place in solution polymerization. Moreover, when the number-average molecular weight of the acrylic copolymer is lower than 5,000, water-dispersibility often becomes poor and a degree of gelation tends to decrease in producing the finely divided gelled polymer. Meanwhile, when the number-average molecular weight of the acrylic copolymer is higher than 100,000, viscosity of the copolymer solution goes high, and there is a tendency that the copolymer is hardly dispersed in water.

The acrylic copolymer can be dispersed in water by a method known per se. For example, the acrylic copolymer containing the alkoxysilane group and the cationic group and optionally the hydroxyl group, produced as above, is neutralized with an acid such as formic acid, acetic acid, lactic acid or hydroxyacetic acid in an amount of about 0.1 to 1 equivalent relative to an amino group, if the cationic group is the amino group, and the neutralized copolymer is then dispersed in water such that a solids content reaches about 40% by weight or less.

The dispersed particles in the water dispersion of the acrylic copolymer are crosslinked thereinside. Crosslinking of the particles thereinside may be conducted to some extent by simply storing the dispersion for a long period of time. Advantageously, it is advisable to promote the crosslinking of particles thereinside by heating the water dispersion at a temperature of about 50° C. or higher. Alternatively, it is also possible that a catalyst for condensation of the silanol group such as tin octylate, zinc octylate, zirconium octylate or dibutyltin laurate is added to an acrylic copolymer solution or aqueous medium, and the copolymer is dispersed in the presence of said catalyst after neutralizing, whereby crosslinking of particles thereinside is carried out simultaneously with dispersing the particle of the acrylic copolymer in water.

The thus obtained water dispersion of the finely divided gelled polymer can contain a resin solids content of usually, about 10 to 40% by weight, preferably 15 to 30% by weight. A particle size of the dispersed particles is generally 0.5 microns or less, preferably 0.01 to 0.3 microns, more preferably 0.05 to 0.2 microns. The particle size can be adjusted by adjusting the amount of the cationic group of the acrylic copolymer; thus, the particles having the above range can easily be obtained.

The cationically electrodepositable finely divided gelled polymer provided by this invention is, if added to an ordinary cationically electrodepositable coating, codeposited without posing problems of agglomeration, abnormal electrodeposition and sedimentation, and acts as a flow modifier in heat curing the electrodeposition-coated film, exhibiting excellent cissing prevention effect, surface smoothness and covering effect of an edge portion. Further, the coated film forms a micro-separation structure, providing a great effect of improvement in properties of the coated film.

Further, the present invention relates to a cationically electrodepositable coating composition containing the above-mentioned finely divided gelled polymer. The cationically electrodepositable coating composition may be composed of the same components as in the conventional cationically electrodepositable coating composition except further containing the finely divided gelled polymer specified in this invention.

The cationically electrodepositable coating composition of this invention may contain, besides the above finely divided gelled polymer, as resin components, resins commonly used in cationically electrodepositable coatings (hereinafter referred to at times as "cationically electrodepositable coating resins"), for example, polyamine resins typified by amine-added epoxy resins, such as (i) adducts of polyepoxide compounds and primary mono- or poly-amines, secondary mono- or polyamines or mixtures of these amines (refer to e.g. U.S. Pat. No. 3,984,299), (ii) adducts of polyepoxide compounds and ketiminized primary amino group-containing secondary mono- or poly-amines (refer to e.g. U.S. Pat. No. 4,017,438), and (iii) reaction products obtained by etherifying polyepoxide compounds and ketiminized primary amino group-containing hydroxy compounds (refer to e.g. Japanese Laid-open Pat. application No. 43,013/1984).

The polyepoxide compounds used to form the polyamine resins are compounds having two or more epoxy groups of formula

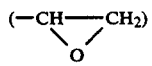

in one molecule. Suitable examples thereof are those having a number-average molecular weight of generally, at least 200, preferably 400 to 4,000, more preferably 800 to 2,000. Compounds obtained by reaction of polyphenol compounds with epichlorohydrin are especially preferable. Examples of the polyphenol compounds used to form the polyepoxy compounds are bis(4-hydroxyphenyl)-2,2-propane, 4,4'-dihydroxy-benzophenone, bis(4-hydroxyphenyl)-1,1-ethane, bis(4- hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylsulfone, phenolic novolak and cresol novolak.

The polyepoxide compounds may be those partially reacted with polyols, polyether polyols, polyester polyols, polyamide amines, polycarboxylic acids or polyisocyanate compounds. Further, those graft-polymerized with -caprolactone or an acrylic monomer are also available.

In case good weatherability is required of a composite cured coated film formed from the composition of this invention, it is convenient to use amino group-containing acrylic resins or nonionic acrylic resins having good weatherability either singly or in combination with the amine-added epoxy resins as the other resin component than the finely divided gelled polymer.

The above amine-added epoxy resins can be cured using polyisocyanate compounds blocked with blocking agent such as alcohols if required.

In addition, amine-added epoxy resins curable without the use of the blocked isocyanate compounds are also available. Examples thereof are a resin obtained by introducing a beta-hydroxyalkyl carbamate group in a polyepoxy substance (refer to e.g. U.S. Pat. No. 4,528,363 and European Pat. No. 119,769) and a resin of a type curable by ester exchange reaction (refer to e.g. U.S. Pat. No. 4,332,711 and European Pat. No. 12,463).

The cationic aqueous solution or water dispersion of the cationically electrodepositable coating resin can usually be prepared by neutralizing said resin with a water-soluble organic acid such as formic acid, acetic acid or lactic acid and then dissolving or dispersing the resulting substance in water.

The thus obtained cationically electrodepositable resin solution or water dispersion is mixed with the aqueous dispersion of the finely divided gelled polymer such that the finely divided gelled polymer is 1 to 35% by weight, preferably 4.5 to 20% by weight, more preferably 5 to 15% by weight based on the total resin solids content (total amount of the cationically electrodepositable coating resin and the finely divided gelled polymer). Where the content of the finely divided gelled polymer in the electrodepositable coating composition is less than 1% by weight based on the total resin solids content, an effect of controlling decrease in melt viscosity of the coated film at the time of baking the electrodeposition-coated film is minimized and an edge covering property of the electrodeposition-coated film is poor. Meanwhile, where the content exceeds 35% by weight, smoothness of the electrodeposition-coated film is poor.

The cationically electrodepositable coating composition of this invention may further contain, if required, ordinary coating additives, for example, color pigments such as titanium oxide, carbon black, iron oxide and chrome yellow; extender pigments such as talc, calcium carbonate, mica, clay and silica; anticorrosive pigments, e.g. chrome pigments such as strontium chromate and zinc chromate, and lead pigments such as basic lead silicate and lead chromate.

The cationically electrodepositable coating composition of this invention can be coated on a surface of a desirable substrate or article by cationic electrodeposition coating. The cationic electrodeposition coating can be performed in a manner known per se. Namely, an electrodeposition bath composed of the cationically electrodepositable coating composition of this invention which is diluted with deionized water to make the solids content about 5 to 40% by weight and is adjusted to pH of 5.5 to 8.0, is usually adjusted to a temperature of 15 to 35° C, a load voltage is 100 to 400 V and a material to be coated is set as a cathode.

A thickness of an electrodeposition coating that can be formed from the coating composition of this invention is not particularly limited. Generally, a thickness of 10 to 40 microns based on the cured coated film is preferable. A suitable baking and curing temperature of the coated film is generally 100 to 200° C.

The cationically electrodepositable coating composition of this invention contains the finely divided gelled polymer to properly control the decrease in melt viscosity of the coated film in curing the electro- deposition-coated film, so as to be able to form the coated film excellent in both smoothness and edge covering property. This is presumably because in heat curing the electrodeposition-coated film, the finely divided gelled polymer contained in the coated film behaves like pigments without melting, and consequently, even if the other resin components allow decrease in melt viscosity, the decrease in melt viscosity of the electro- deposition-coated film is suppressed by interaction between the finely divided gelled polymer and the molten resins.

The cationically electrodepositable composition of this invention has good bath stability and electrodeposition characteristics, and the decrease in viscosity of the coated film in heat curing can be controlled, so that an edge covering property is excellent, anti-corrosion of the edge portion can be improved and a coated film having smooth surface is obtainable.

Besides, the use of the cationically electrodepositable composition of this invention contributes to improving properties of the electrodeposition-coated film such as impact strength, adhesion, scab corrosion resistance, filiform corrosion resistance and chipping resistance. The reason is, though not definitely clarified, presumably that the finely divided gelled polymer functions to relax a stress in the electrodeposition-coated film.

The following Examples and Comparative Examples illustrate this invention more specifically, but this invention is not limited to these examples. In said examples, all "parts" and "%" are on the weight basis.

PREPAATION EXAMPLE OF ACRYLIC COPOLYMER

Example 1

A 1-liter flask fitted with a stirrer, a thermometer, a reflux condenser and a heating mantle was charged with 320 parts of isopropyl alcohol, and heated to a refluxing temperature of about 83° C. with stirring. To this was added dropwise a mixture of the following monomers and polymerization initiator at a refluxing temperature of about 83 to 87° C. over the course of about 2 hours.

|  | parts |
|---|---|
| Styrene | 272 |
| n-Butyl acrylate | 224 |
| 2-Hydroxyethyl acrylate | 80 |
| Dimethylaminoethyl methacrylate | 144 |
| KBM-503* | 80 |
| Axobisisobutylonitrile | 24 |

*Gamma-methacryloxypropyltrimethoxysilane (a product of Shin-Etsu Chemical Co., Ltd.)

The mixture was further stirred for 30 minutes, and a solution of 8 parts of azobisdimethylvaleronitrile in 120 parts of isopropyl alcohol was then added dropwise over the course of about 1 hour. After the mixture was stirred for about 1 hour, 320 parts of isopropyl alcohol was charged andthe resulting mixture was cooled. There resulted an acrylic copolymer varnish having a solids content of 51%, an amine value of 64, a hydroxyl value of 48 and a number-average molecular weight of about 20,000.

Example 2

Using the following monomer mixture, an acrylic copolymer varnish was formed as in Example 1.

|  | parts |
|---|---|
| Isobutyl acrylate | 480 |
| 2-Hydroxyethyl acrylate | 80 |
| Dimethylaminoethyl methacrylate | 160 |
| KBM-503 | 80 |

The resulting acrylic copolymer varnish had a solids content of 50%, an amine value of 71, a hydroxyl value of 43 and a number-average molecular weight of about 15,000.

Example 3

A 1-liter flask fitted with a stirrer, a thermometer, a reflux condenser and a heating mantle was charged with 425 parts of isopropyl alcohol and 12 parts of methyl ethyl ketone, and the mixture was heated to 80° C. with stirring. To this was added a mixture of the following monomers, solvent and polymerization initiator over the course of about 3 hours while keeping the temperature at 80° C.

|  | parts |
|---|---|
| Styrene | 304 |
| n-Butyl acrylate | 208 |
| 2-Hydroxyethyl acrylate | 80 |
| Dimethylaminopropylacrylamide | 56 |
| KBM-503 | 80 |
| Methyl ethyl ketone | 96 |
| Azobisisobutylonitrile | 24 |

After the mixture was further stirred for 1 hour, half of the mixture of 76 parts of methyl ethyl ketone and 16 parts of azobisisobutylonitrile was added dropwise over the course of 30 minutes. Thirty minutes after the addition, the remaining half thereof was added dropwise over the course of 30 minutes. Subsequently, 190 parts of ethylene glycol monobutyl ether was charged and the mixture was cooled. There was obtained an acrylic copolymer varnish having a solids content of 50%, an amine value of 25, a hydroxyl value of 48 and a numberaverage molecular weight of about 21,000.

Example 4

Example 3 was repeated except using a mixture of the following monomers, solvent and polymerization initiator. There was obtained a glycidyl group-containing copolymer varnish.

|  | parts |
|---|---|
| Styrene | 312 |
| n-Butyl acrylate | 224 |
| 2-Hydroxyethyl acrylate | 40 |
| Glycidyl methacrylate | 144 |
| KBM-503 | 80 |
| Methyl ethyl ketone | 96 |
| Azobisisobutylonitrile | 24 |

Subsequently, the resulting glycidyl group-containing copolymer varnish was kept at 70° C., and a mixture of 69 parts of monomethylaminoethanol and 69 parts of ethylene glycol monobutyl ether was charged. After stirring continued for 3 hours, the mixture was cooled. There resulted an acrylic copolymer varnish having a solids content of 50%, an amine value of 64, a hydroxyl value of 82 and a number-average molecular weight of about 23,000.

PREPARATION EXAMPLE OF FINELY DIVIDED GELLED POLYMER

Example 5

A 2-liter flask was charged with 780 parts of the acrylic copolymer varnish obtained in Example 1 and 6.4 parts of acetic acid, and the mixture was stirred at 30° C. for 5 minutes. Subsequently, 1,156 parts of deionized water was added dropwise over the course of about 30 minutes with vigorous stirring. The temperature was raised to 75 to 80° C., and the mixture was stirred for about 3 hours.

There resulted an opaque dispersion of a finely divided gelled polymer particles crosslinked thereinside and having a solids content of 20%. An average particle size of the fine particles in ethylene glycol monobutyl ether was 0.15 micron.

Example 6

A 2-liter flask was charged with 390 parts of the acrylic copolymer obtained in Example 1, 0.2 part of tin octylate, 42.8 parts of 10% acetic acid, and the mixture was stirred at about 30° C for 5 minutes. Thereafter, 567 parts of deionized water was added dropwise with vigorous stirring over the course of about 30 minutes.

There was obtained an opaque dispersion of a finely divided gelled polymer particles crosslinked thereinside and having a solids content of 20% and an average particle size in ethylene glycol ether of 0.05 micron.

Example 7

Example 5 was repeated except using the acrylic copolymer varnish obtained in Example 2. There resulted a dispersion of a finely divided gelled polymer particles crosslinked thereinside. An average particle size in ethylene glycol monobutyl ether of the fine particles was 0.20 micron.

Example 8

Example 5 was repeated except that the acrylic copolymer varnish obtained in Example 3 was used and the amount of acetic acid was 5.0 parts. There was obtained a dispersion of a finely divided gelled polymer particles crosslinked thereinside. An average particle size in ethylene glycol monobutyl ether of the fine particles was 0.07 micron.

Example 9

Example 5 was repeated except using the acrylic copolymer varnish obtained in Example 4. There was obtained a dispersion of a finely divided gelled polymer particles crosslinked thereinside. An average particle size in ethylene glycol monobutyl ether of the fine particles was 0.15 micron.

PREPARATION EXAMPLE OF CATIONICALLY ELECTRODEPOSITABLE COATING COMPOSITION

Example 10

Seventy five parts of the dispersion of the finely divided gelled polymer having the solids content of 20%, obtained in Example 5, and 139.4 parts of the following pigment paste A having a solids content of 43% were added with stirring to 572 parts of a clear emulsion for cationic electrodeposition (Elecron 9450, a tradename for a product of Kansai Paint Co., Ltd.) composed of a polyamide-modified epoxy resin and a completely blocked diisocyanate and having a solids content of 35%, and the mixture was diluted with 588.5 parts of deionized water. There resulted a cationically electrodepositable coating.

|  | Pigment paste A | Pigment paste B |
|---|---|---|
| Modified epoxy resin | 5 | 5 |
| Titanium oxide | 14 | 28 |
| Purified clay | 10 | 15 |
| Silica | — | 5 |
| Carbon black | 1 | 2 |
| Deionized water | 39.7 | 72.9 |
| Total | 69.7 | 127.9 |

Example 11

A cationically electrodepositable coating was obtained as in Example 10 except using 150 parts of the dispersion of the finely divided gelled polymer obtained in Example 6.

Example 12

A cationically electrodepositable coating was obtained as in Example 10 except using 100 parts of the dispersion of the finely divided gelled polymer obtained in Example 7.

Example 13

Hundred parts of the dispersion of the finely divided gelled polymer having the solids content of 20%, obtained in Example 5 and 139.4 parts of the pigment paste A having the solids content of 43% were added with stirring to 626 parts of a clear emulsion for cationic electrodeposition (Elecron 9600, a tradename for a product of Kansai Paint Co., Ltd.) composed of a polyestermodified epoxy resin, a completely blocked diisocyanate and a nonionic acrylic resin and having a solids content of 32%, followed by diluting the mixture with 534.6 parts of deionized water. There was obtained a cationically electrodepositable coating.

Example 14

Sixty parts of the finely divided gelled polymer havin9 the solids content of 20%, obtained in Example 6 and 139.4 parts of the pigment paste A havinq the solids content of 43% were added with stirring to 626 parts of a clear emulsion for cationic electrodeposition (Elecron 9600, a tradename for a product of Kansai Paint Co., Ltd.) having a solids content of 32%, followed by diluting the mixture with 534.6 parts of deionized water. There resulted a cationically electrodepositable coating.

Example 15

A cationically electrodepositable coating was obtained as in Example 13 except using 170 parts of the dispersion of the finely divided gelled polymer obtained in Example 7.

Example 16

A cationically electrodepositable coating was obtained as in Example 13 except using 100 parts of the dispersion of the finely divided gelled polymer obtained in Example 8.

Example 17

A cationically electrodepositable coating was obtained as in Example 13 except using 100 parts of the dispersion of the finely divided gelled polymer obtained in Example 9.

Comparative Example 1

A cationically electrodepositable coating was obtained as in Example 10 except that the dispersion of the finely divided gelled polymer was not blended.

Comparative Example 2

A cationically electrodepositable coating was obtained as in Example 13 except that the dispersion of the finely divided gelled polymer was not blended.

Comparative Example 3

With stirring, 255.8 parts of the pigment paste B having the solids content of 43% was added to 626 parts of a clear emulsion for cationic electrodeposition (Elecron 9600, a tradename for a product of Kansai Paint Co., Ltd.) having the solids content of 32%, followed by diluting the mixture with 668 parts of deionized water.

There was obtained a cationically electrodepositable coating having a high pigment concentration.

A 0.8 x 300 x 90 mm cold-rolled dull steel plate (an angle of edge portion was 45°) chemically treated with Palbond 3030 (a tradename for a product of Nihon Parkerizing Co., Ltd., zinc phosphate-type) was dipped in each of the cationically electrodepositable coatings obtained in Examples 10 to 17 and Comparative Examples 1 to 3, and electrodeposition coating was conducted using the above plate as a cathode. The conditions of an electrodeposition coating bath were that a temperature was 30° C., pH 6.5 and a voltage 300 V. An electrodeposition-coated film having a thickness of 20 microns (based on a dry film thickness) was formed, then washed with water and baked at 185° C for 20 minutes. The properties of the coated plates were measured with the results shown in Table 1. Moreover, melt viscosities of the coated plates were also measured and the results are shown in Table 1.

TABLE 1

|  | Example | | | | | | | | Comparative Example | | |
|---|---|---|---|---|---|---|---|---|---|---|---|
|  | 10 | 11 | 12 | 13 | 14 | 15 | 16 | 17 | 1 | 2 | 3 |
| Melt viscosity of*1 coated film | $10^5$ | $10^6$ | $10^5$ | $10^5$ | $10^5$ | $10^6$ | $10^5$ | $10^5$ | $10^2$ | $10^2$ | $10^5$ |
| Covering property of*2 edge surface | ◉ | ◉ | ◉ | ◉ | ◯ | ◉ | ◉ | ◯ | X | X | ◯ |
| Smoothness of coated*3 surface | ◯ | ⓐ | ◯ | ◯ | ◯ | ⓐ | ◯ | ◯ | ◯ | ◯ | △ |
| Impact resistance (cm)*4 | 50 | 50 | 50 | 50 | 50 | 50 | 50 | 50 | 40 | 40 | 20 |
| Chipping resistance*5 | ◉ | ◉ | ◉ | ◉ | ◉ | ◉ | ◉ | ◉ | ⓐ | ⓐ | △ |
| Adhesion after dipping*6 in hot water | ◉ | ◉ | ◉ | ◉ | ◉ | ◉ | ◉ | ◉ | ◯ | ◯ | ⓐ |
| Salt spray resistance*7 (mm) | 2.0 | 2.0 | 2.0 | 2.5 | 2.5 | 2.5 | 2.5 | 2.5 | 2.0 | 2.5 | 2.5 |
| Two-coat weatherability*6 (hrs) | 40 | 40 | 40 | 180 | 180 | 180 | 180 | 180 | 40 | 180 | 180 |

[Methods for measuring properties]

*1Melt viscosity of coated film: The melt viscosity of the electrodeposition-coated film in baking is evaluated from a heat flow appearance of a pencil scratch based on the melt viscosity by a measuring method using a rolling ball (according to JIS-Z-0237). The value is a minimum viscosity (centipoise).

*2Covering property of edge surface: Electrodeposition coating is conducted on a steel plate having an edge angle of 45° under such condition that a thickness of a cured film in a general portion becomes 20 microns, and the coated steel plate is cured under given baking conditions to prepare a test plate. The test plate is put on a salt spray device such that the edge of the test plate is vertical, and then a salt spray test is continued for 168 hours in accordance with JIS Z-2371. Corrosion resistance of the 45° edge portion is evaluated as follows:
◉: Rust does not occur at all.
◯: Rust slightly occurs.
X: Rust heavily occurs.

*3Smoothness of coated surface: A finishing property of the electrodeposition-coated surface is evaluated by visual observation.
◯: Good
ⓐ: Nearly good
△: Slightly bad

*4Impact resistance: Measured in an atmosphere of 20° C. according to JIS K5400-1979 6, 13, 3B. The value is a maximum height (cm) that does not cause a damage of the coated film under such conditions that a dropped weight is 500 g and a diameter of a rear end of an impact center is ½ inch. The maximum value is 50 cm.

*5Chipping resistance: The electrodeposition-coated, baked plate is further coated with thermosetting intermediate coat and topcoat and heat-cured. The resulting plate is subjected to the following test.
¹Test device: Q-G-R gravelometer (a device of Q Panel Company)
²Stones to be air-blasted: ground stong having a diameter of 15 to 20 mm
³Volume of stones to be air-blasted: about 500 ml
⁴Pressure of a blasting air: about 4 kg/cm²
⁵Temperature in test: about 20° C.

A test piece is fixed on a test piece holding base, and about 500 ml of ground stones are shot against the test piece at a blasting air pressure of about 4 kg/cm². Thereafter, the condition of the coated surface and the salt spray resistance are evaluated. The condition of the coated surface is evaluated by visual observation according to the following standard.

◉ (good): A flaw due to shooting is slightly observed on part of the topcoat and the electrodeposition-coated film is not peeled off at all.
ⓐ (slightly bad): A flaw due to shooting is observed on the top coat and the intermediate coat, and the electrodeposition-coated film is slightly peeled off.
△(bad): A flaw due to shooting is heavily observed on the topcoat and the intermediate coat and the electrodeposition-coated film is notably peeled off.

*6Adhesion after dipping in hot water: After dipping in water of 40° C. for 20 days, 100 squares having a size of 1 × 1 mm are provided on the coated film in accordance with JIS K-5400-1979 6.15, and an adhesive cellophane tape is put on the surface. Said tape is abruptly peeled off and the condition of the coated surface is evaluated.
◉: Good
◯: An edge of the crosscut is slightly peeled off.
ⓐ: Some parts of the 100 squares are peeled off.

*7Salt spray resistance: The electrodeposition-coated film is crosscut by a knife up to the substrate, and a salt spray test is run for 1,000 hours in accordance with JIS Z2371.

TABLE 1-continued

Width of rust or swollen portion occuring in the crosscut portion given by the knife are measured.
*[8]Two coat weatherability: The electrodeposition-coated, baked plate is further coated with an aminoalkyd resin clear coating (Amilac Clear, a product of Kansai Paint Co., Ltd.) to a thickness of 35 microns, and baked at 140° C. for 15 minutes. The resulting coated plate is exposed to a sunshine weatherometer for 20 hours and dipped in water of 40° C. for 20 hours. Subsequently, the coated plate is crosscut and a peeling test is run with an adhesive cellophane tape. This test is repeasted and a time in which peeling occurs is measured.

What we claim is:

1. A cationically electrodepositable finely divided gelled polymer obtained by dispersing an acrylic copolymer containing a hydrolyzable alkoxysilane group and an acid-neutralized cationic group in water to form dispersed copolymer particles and crosslinking said dispersed copolymer particles.

2. The finely divided gelled polymer of claim 1 wherein the cationic group is a tertiary amino group.

3. The finely divided gelled polymer of claim 2 wherein the acrylic copolymer is a copolymer composed of, as essential components, (a) a polymerizable unsaturated vinylsilane monomer containing a polymerizable unsaturated double bond and a hydrolyzable alkoxysilane group and (b) a polymerizable unsaturated monomer containing a polymerizable unsaturated double bond and a tertiary amino group.

4. The finely divided gelled polymer of claim 2 wherein the acrylic copolymer is an acrylic copolymer obtained by reacting a secondary amine with a glycidyl group of a copolymer composed of, as essential monomer components, (a) a polymerizable unsaturated vinylsilane monomer containing a polymerizable unsaturated double bond and a hydrolyzable alkoxysilane group, and a glycidyl group-containing unsaturated vinyl monomer, and optionally as additional monomer components, (c) a polymerizable unsaturated monomer containing a polymerizable unsaturated double bond and a hydroxyl group and/or (d) the other polymerizable unsaturated monomer.

5. The finely divided gelled polymer of claim 3 or 4 wherein the vinylsilane monomer (a) is selected from vinyltrimethoxysilane, vinyltriethoxysilane, vinyltris-beta-methoxyethoxysilane, gamma-acryloxypropyltrimethoxy silane, gamma-methacryloxypropyltrimethoxysilane and gamma-methacryloxypropylmethyldimethoxysilane.

6. The finely divided gelled polymer of claim 3 or 4 wherein the vinylsilane monomer (a) is gamma-methacryloxypropyltrimethoxysilane.

7. The finely divided gelled polymer of claim 3 wherein the polymerizable unsaturated monomer (b) is a compound selected from dialkylaminoalkyl (meth)acrylates in which each of the alkyls has 1 to 6 carbon atoms and dialkylaminoalkyl(meth)acrylamides in which each of the alkyls has 1 to 6 carbon atoms.

8. The finely divided gelled polymer of claim 4 wherein the glycidyl group-containing unsaturated vinyl monomer is a compound selected from glycidyl acrylate and glycidyl methacrylate.

9. The finely divided gelled polymer of claim 3 or 4 wherein the polymerizable unsaturated monomer (c) is selected from 2-hydroxyethyl (meth)acrylate and hydroxypropyl (meth)acrylate.

10. The finely divided gelled polymer of claim 3 wherein the acrylic copolymer is an acrylic copolymer composed of 1 to 30% by weight of the vinylsilane monomer (a), 5 to 30% by weight of the polymerizable unsaturated monomer (b), 0 to 30% by weight of the polymerizable unsaturated monomer (c) and 10 to 94% by weight of the polymerizable unsaturated monomer (d).

11. The finely divided gelled polymer of claim 1 wherein the acrylic copolymer has an amine value of about 10 to about 100, a hydroxyl value of about 200 or less and a number-average molecular weight of about 5,000 to about 100,000.

12. The finely divided gelled polymer of claim 3 wherein the acrylic copolymer is a copolymer further comprising, as additional monomer components, (c) a polymerizable unsaturated monomer containing a polymerizable unsaturated double bond and a hydroxyl group.

13. The finely divided gelled polymer of claim 3 or 19 wherein the acrylic copolymer is a copolymer further comprising, as additional monomer components, (d) a polymerizable unsaturated monomer other than monomers (a), (b) and (c).

* * * * *